(12) United States Patent
Xu et al.

(10) Patent No.: US 10,823,399 B2
(45) Date of Patent: Nov. 3, 2020

(54) BURNER, GAS WATER HEATER AND PROCESSING METHOD OF FIRE ROW

(71) Applicant: A. O. SMITH CORPORATION, Milwaukee, WI (US)

(72) Inventors: Yijun Xu, Nanjing (CN); Maohu Cai, Nanjing (CN); Ruihong Wei, Nanjing (CN)

(73) Assignee: A. O. SMITH CORPORATION, Milwaukee, WI (US)

(*) Notice: Subject to any disclaimer, the term of this patent is extended or adjusted under 35 U.S.C. 154(b) by 170 days.

(21) Appl. No.: 15/892,695

(22) Filed: Feb. 9, 2018

(65) Prior Publication Data
US 2018/0231244 A1 Aug. 16, 2018

(30) Foreign Application Priority Data

Feb. 10, 2017 (CN) .......................... 2017 1 0073417

(51) Int. Cl.
*F23D 14/14* (2006.01)
*F23D 14/02* (2006.01)
(Continued)

(52) U.S. Cl.
CPC ........... *F23D 14/02* (2013.01); *B21D 35/001* (2013.01); *B21D 35/002* (2013.01); *B23P 15/00* (2013.01);
(Continued)

(58) Field of Classification Search
CPC .... F23D 14/586; F23D 14/045; F23D 14/105; F23D 14/14; F23D 14/02; F23C 5/14
See application file for complete search history.

(56) References Cited

U.S. PATENT DOCUMENTS 5,368,476 A * 11/1994 Sugahara ................ F23D 14/26
431/285
5,661,905 A * 9/1997 Nakaura ............... F23D 14/045
29/428
(Continued)

FOREIGN PATENT DOCUMENTS

CN 201259219 Y 6/2009
CN 201262398 Y 6/2009
(Continued)

OTHER PUBLICATIONS

Chinese Patent Office Action for Application No. 201710073417.4 dated Feb. 26, 2018 (18 pages, English translation included).
(Continued)

*Primary Examiner* — Gregory A Wilson
(74) *Attorney, Agent, or Firm* — Michael Best & Friedrich LLP (57) ABSTRACT

The present invention discloses a burner, a gas water heater and a processing method of fire row, wherein the burner comprising: a plurality of fire rows; an air channel is formed between at least two fire rows; the fire row has a burning substrate; the burning substrate is provided with main burning holes; the burning substrate is further provided with auxiliary burning holes downstream of the main burning holes; at least one the auxiliary burning hole is disposed on at least one side of the main burning hole in a length direction of the burning substrate; flame of the auxiliary burning hole intersect with flame of the main burning hole; and a frame for mounting the fire rows. The burner, the gas water heater and the processing method of the fire rows disclosed in the present invention can help to decrease flame height, facilitate manufacturing and reduce costs.

19 Claims, 8 Drawing Sheets

(51) Int. Cl.
*B21D 35/00* (2006.01)
*F24H 9/18* (2006.01)
*B23P 15/00* (2006.01)
*F24H 1/00* (2006.01)
*F23D 14/04* (2006.01)
*F23D 14/62* (2006.01)

(52) U.S. Cl.
CPC ......... *F23D 14/045* (2013.01); *F24H 1/0027* (2013.01); *F24H 9/1836* (2013.01); *F23D 14/62* (2013.01); *F23D 2203/1026* (2013.01)

(56) References Cited

U.S. PATENT DOCUMENTS

| | | | | |
|---|---|---|---|---|
| 9,551,488 | B2 * | 1/2017 | Akagi | F23D 14/105 |
| 9,933,155 | B2 * | 4/2018 | Ojiro | F23C 6/047 |
| 10,495,302 | B2 * | 12/2019 | Huang | F23D 14/583 |
| 2014/0165991 | A1 * | 6/2014 | Noman | F24H 9/0068 |
| | | | | 126/116 A |
| 2016/0061491 | A1 * | 3/2016 | Cheng | F24H 9/1836 |
| | | | | 29/890.02 |
| 2018/0087772 | A1 * | 3/2018 | Huang | F23D 14/14 |

FOREIGN PATENT DOCUMENTS

| | | | |
|---|---|---|---|
| CN | 205299526 U | 6/2016 | |
| CN | 206531059 U | 9/2017 | |
| DE | 4025060 A1 * | 2/1991 | ........... F23D 14/105 |
| JP | H0525119 U | 4/1993 | |

OTHER PUBLICATIONS

Chinese Patent Office Action for Application No. 201710073417.4 dated Oct. 17, 2017 (17 pages, English translation included).
Chinese Patent Office Search Report for Application No. 201710073417.4 dated Oct. 9, 2017 (4 pages, English translation included).

* cited by examiner

BURNER, GAS WATER HEATER AND PROCESSING METHOD OF FIRE ROW

TECHNICAL FIELD

The present invention relates to the field of water heaters, and in particular, to a burner, a gas water heater and a processing method of fire row.

BACKGROUND

Premixed burning means that fuel gas and air are mixed in a premixing chamber and the mixed gas is burned in the burner. Non-full premixed burner is a premixed burner prevalent on the market at present. The non-full premixed burner allows the fuel gas for a primary mixing with air before burning in use of burning fire rows arranged in strips, and during the burning on the fire rows, a secondary auxiliary burning is performed using the air brought by the air channel between the fire rows, thereby speeding up burning rate of the fuel gas. At present, when gas is ejected from fire row and burned, the flame formed on the fire row has a higher height, so that it is essential to design a higher height of enclosure frame, thereby resulting in higher manufacturing costs.

In addition, an existing structure of the fire row is complicated with more materials and complicated processing technology, which also results in increased processing costs.

SUMMARY

In view of the above problems, it is necessary for the present invention to provide a burner, a gas water heater and a processing method of fire row, so that it is able to solve at least one of the above problems.

The present invention adopts the following technical solutions:

a burner, comprises:

a plurality of fire rows; an air channel is formed between at least two of the fire rows; the fire row has a burning substrate; the burning substrate is provided with main burning holes; the burning substrate is further provided with auxiliary burning holes downstream of the main burning holes; at least one of the auxiliary burning holes is disposed on at least one side of the main burning holes in a length direction of the burning substrate; flame of the auxiliary burning hole intersect with flame of the main burning hole; and a frame for mounting the fire rows.

As a preferred embodiment, at least two of the auxiliary burning holes are disposed on two sides of the main burning hole in the length direction of the burning substrate.

As a preferred embodiment, the auxiliary burning holes on two sides of the main burning hole are disposed to be opposite.

As a preferred embodiment, the burning substrate has a substrate surface; the burning substrate is provided with a burning platform; the main burning holes are disposed on the burning platform; the burning platform has a platform surface; and the substrate surface is disposed downstream of the platform surface.

As a preferred embodiment, the auxiliary burning holes are disposed between the substrate surface and the platform surface.

As a preferred embodiment, a plurality of grooves are formed by being punched on the burning substrate to depart from a burning direction of the fire row; bottom surfaces of the grooves is the platform surface, and the auxiliary burning hole is disposed on side wall of the groove.

As a preferred embodiment, the auxiliary burning hole is formed by fracture of the side wall of the groove when the groove is punched.

As a preferred embodiment, the plurality of grooves are arranged in the length direction of the burning substrate, and each of the grooves is provided with at least one the main burning hole.

As a preferred embodiment, the fire row further includes a gas-mixing structure that is at upstream of the burning substrate in the burning direction; the gas-mixing structure can mix air with fuel gas; and the gas-mixing structure transports mixed gas to the burning substrate via a gas transportation channel.

As a preferred embodiment, the fire row is formed as an integral structure.

As a preferred embodiment, the fire row is molded by punching and bending a metal plate.

As a preferred embodiment, at least two the fire rows are parallel to each other; and the air channel is disposed between adjacent two the fire rows.

A gas water heater comprises: the burner according to anyone of the above embodiments.

A processing method of fire row of the burner as described above, the processing method comprising steps of:

punching a metal plate; and bending the punched metal plate to form the fire row.

As a preferred embodiment, punching a metal plate comprising:

punching the metal plate to form a predetermined symmetrical shape;

punching a middle region of the predetermined symmetrical shape to form burning holes, the burning holes including main burning holes and auxiliary burning holes;

correspondingly, bending the punched metal plate to form the fire row comprising steps of:

bending the metal plate to make the predetermined symmetrical shape be aligned to form a gas-mixing structure and a gas transportation channel, the gas-mixing structure capable of mixing air with fuel gas, and the gas-mixing structure transporting mixed gas to the burning holes via the gas transportation channel.

As a preferred embodiment, punching a metal plate comprising steps of:

punching the metal plate to form burning holes, the burning holes including main burning holes and auxiliary burning holes;

punching two sides of the burning hole to form a predetermined symmetrical shape;

correspondingly, bending the punched metal plate to form the fire row comprising steps of:

bending the metal plate to make the predetermined symmetrical shape be aligned to form a gas-mixing structure and a gas transportation channel, the gas-mixing structure capable of mixing air with fuel gas, and the gas-mixing structure transporting mixed gas to the burning holes via the gas transportation channel.

As a preferred embodiment, a direction for punching the burning holes is opposite to a direction for punching the predetermined shape.

As a preferred embodiment, the method further comprising:

shaping and/or trimming the punched metal plate.

As a preferred embodiment, punching to form burning holes comprising steps of:

punching the metal plate to form a plurality of grooves; side walls of the grooves are fractured in the punching to form the auxiliary burning holes; and piercing bottoms of the grooves to form the main burning holes.

Advantageous effects of the present invention are provided as follows:

the burner provided by the present invention positions the auxiliary burning hole downstream of the main burning hole (in the gas transportation direction of the mixed gas) and on at least one side of the main burning hole along the length direction of the burning substrate. In this case, different degrees of vortex flows may be formed when the mixed gas is ejected from the auxiliary burning hole, the vortex flows may be involved in the air provided by the air channel to increase a burning area of the flame. A volume of the burning flame is constant in the case of a constant power, the burning height of the flames can be reduced in the case where the burning area is increased, thus the burner of the present invention can reduce the height of the flame, hence reduce the height of the enclosure frame and save the manufacturing costs.

Meanwhile, the auxiliary burning hole are located on at least one side of the main burning hole along the length direction of the burning substrate, so that both the auxiliary flame and the main flame are arranged along the length direction of the burning substrate, and the flame area under such a structure is also increased, hence the flames of the burning holes on the burning substrate easily forms an integral flame along the length direction of the burning substrate, which not only can make better use of the air provided by the air channel, but also can achieve a more even heating.

In addition, the fire row in such structure can be of an integral structure, which can be molded by punching and bending a metal plate, thereby simplifying manufacturing process and saving manufacturing costs. At the same time, the fire row decrease more than a dozen grams, as compared with the existing fire row in terms of weight, and can decrease material costs significantly.

The specific embodiments of the present invention have been disclosed in detail with reference to the following description and drawings, and the manner in which the principles of the present invention may be employed is indicated. It should be understood that the embodiments of the present invention are not limited in scope. The embodiments of the present invention include various changes, modifications, and equivalents within the spirit and scope of the appended claims.

Features described and/or illustrated with respect to one embodiment may be used in one or more other embodiments in the same or similar manner, in combination with features in other embodiments, or in place of features in other embodiments.

It should be emphasized that the term "comprises/comprising" as used herein refers to the presence of features, integers, steps or components, but does not exclude the presence or addition of one or more other features, integers, steps or components.

Other aspects of the invention will become apparent by consideration of the detailed description and accompanying drawings.

BRIEF DESCRIPTION OF THE DRAWINGS

To illustrate the technical solutions in the embodiments of the present invention or in the prior art more clearly, the accompanying drawings required for describing the embodiments or the prior art are briefly introduced below. Apparently, the accompanying drawings in the following description merely illustrate some embodiments of the present invention. Other drawings may also be obtained for those skilled in the art based on these drawings without creative efforts.

DETAILED DESCRIPTION

In order to enable those skilled in the art to better understand the technical solutions in the present invention, the technical solutions in the embodiments of the present invention are clearly and completely described below with reference to the accompanying drawings in the embodiments of the present invention. Apparently, the described embodiments are only a portion but not all of the embodiments of the present invention. All other embodiments obtained by those skilled in the art based on the embodiments of the present invention without creative efforts shall fall within the protection scope of the present invention.

It should be noted that when an element is referred to as being "disposed on" another element, it can be directly located on another element or intervening elements may also be present. When one element is considered as being "connected" to another element, it can be directly connected to another element or there may also be an intervening element. The terms "perpendicular", "horizontal", "left", "right" and the like as used herein are for illustrative purposes only and do not represent the only embodiments.

Unless otherwise defined, all technical and scientific terms used herein have the same meaning as commonly understood by those skilled in the technical field to which this invention belongs. The terminology used in the Description of the present invention herein is for purposes of describing specific embodiments only, and is not intended to limit the present invention. As used herein, the term "and/or" includes any and all combinations of one or more of the associated listed items.

Referring to FIGS. 1 to 13, there is provided a burner 100 according to an embodiment of the present invention. The burner 100 comprises: a plurality of fire rows 1; an air channel 2 is formed between at least two the fire rows 1. The fire row 1 have a burning substrate 11; the burning substrate 11 is provided with main burning holes 13; the burning substrate 11 is further provided with auxiliary burning holes 15 downstream of the main burning holes 13; at least one the auxiliary burning hole 15 is disposed on at least one side of the main burning hole 13 in a length direction of the burning substrate 11; flame of the auxiliary burning hole 15 intersect with flame of the main burning hole 13. The burner 100 also comprises a frame 3 for mounting the fire row 1.

In use, the mixed gas of fuel gas and air is supplied to the burning substrate 11 of the fire row 1, and is burned on the burning substrate 11. The mixed gas is discharged and burned from the auxiliary burning hole 15 (which may also be referred to as auxiliary fire holes) and the main burning hole 13 (which may also be referred to as main fire holes). The flame of the auxiliary burning hole 15 intersect with the flame of the main burning hole 13. The auxiliary burning hole 15 are located downstream of the main burning hole 13 (in the gas transportation direction of the mixed gas) and on at least one side of the main burning hole 13 along the length direction of the burning substrate 11. In this case, different degrees of vortex flows may be formed when the mixed gas is ejected from the auxiliary burning hole 15, the vortex flows may be involved in the air provided by the air channel 2 to increase a burning area of the flame. A volume of the burning flame is constant in the case of a constant power, the burning height of the flame can be reduced in the case where the burning area is increased, thus the burner of this embodiment can reduce the height of the flames, hence reduce the height of the enclosure frame 4 and save the manufacturing costs.

Meanwhile, the auxiliary burning hole 15 are located on at least one side of the main burning hole 13 along the length direction of the burning substrate 11, so that both the auxiliary flame and the main flame are arranged along the length direction of the burning substrate 11, and the flame area under such a structure is also increased, hence the flames of the burning holes on the burning substrate easily forms an integral flame along the length direction of the burning substrate, which not only can make better use of the air provided by the air channel, but also can achieve a more even heating.

In addition, the fire row 1 in such structure can be of a one-piece structure, which can be molded by punching and bending a metal plate, thereby simplifying manufacturing process and saving manufacturing costs. At the same time, the fire row 1 decreases more than a dozen grams, as compared with the existing fire row in terms of weight, and can decrease material costs significantly.

Figure 7:
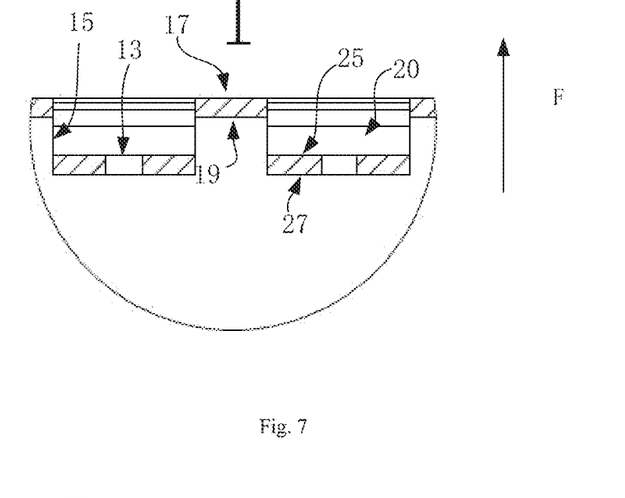
FIG. 7 is a partial I enlarged view of FIG. 6.
Figure 8:
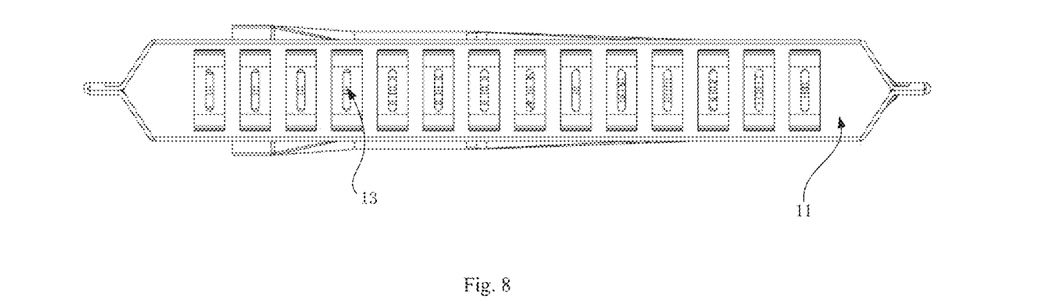
FIG. 8 is a top view of FIG. 4.

In this embodiment, the mixed gas transported upstream of the burning substrate 11 is burned at the burning holes (the main burning holes 13 and the auxiliary fire holes 15) to generate flame, where the auxiliary burning holes 15 are located downstream of the main burning holes 13, and it can be understood that in the transportation direction of combustible gases, the auxiliary burning holes 15 are located downstream of the main burning holes 13. In addition, the burning substrate 11 may further have the burning direction F as shown in FIG. 7. The auxiliary burning holes 15 are also located downstream of the main burning holes 13 in the view of the burning direction of the burning substrate 11.

In this embodiment, at least two the auxiliary burning holes 15 are provided on two sides of the main burning hole 13 along the length direction of the burning substrate 11, where the burning substrate 11 is arranged in strips as a whole, and has a width approximately corresponding to that of the fire row 1. At least two the auxiliary burning holes 15 are arranged on two sides of the main burning hole 13 to interact with the air supplied by the air channel 2 to increase a burning area of the flames, so as to hold the height of flame down.

In this embodiment, the flame of the auxiliary burning hole 15 may be disposed so as to intersect with the flame of the main burning hole 13. It is implemented that the auxiliary burning holes 15 located on two sides of the main burning hole 13 may be provided to confront the flames of the main burning holes 13, so that the mixed gas intersects in the gas flow direction after flowing out through the auxiliary burning holes 15 and the main burning holes 13, and hence forms intersecting flames, so as to finally achieve the effect of suppressing flameout. The auxiliary burning holes 15 on two sides of the main burning hole 13 may be oppositely disposed (aligned) or may be staggered with each other or even partially overlapped, which is not limited in the present invention.

Preferably, the auxiliary burning holes 15 on two sides of the main burning hole 13 are oppositely disposed. The flames of the auxiliary burning holes 15 intersect with the flames of the main burning holes 13. This arrangement can allow for the main flame and the auxiliary flame to intersect with each other, i.e., forming a flame opposing phenomenon.

Specifically, the mixed gas flow passing through the main burning hole 13 may be a first mixed gas flow, and the flame generated during the burning of the first mixed gas flow may be the main flame; the mixed gas flow passing through the auxiliary burning hole 15 may be a second mixed gas flow, and the flame generated during the burning of the second mixed gas flow may be the auxiliary flame. The direction of the first mixed gas flow intersects with that of the second mixed gas flow, so that the main flame intersects with the auxiliary flame, that is, forming the flame opposing phenomenon, thereby reducing the height of the flame.

Meanwhile, the positions of the main flame and the auxiliary flame are staggered (intersected) in this embodiment, diffusion and exchange of fluids can be formed between the fluids that burn products at a burning interface at the interfaces adjacent to the two flame portions so that the burning propagates in the neighborhood, thus also expanding the burning area in the same outgassing conditions, which not only reduces the burning height of the main flame, but also further reduces the flame height by reducing the burning intensity.

In this embodiment, the fire rowl can be made of a metal material. For example, the fire row 1 can be made of aluminum or stainless steel. Preferably, the fire row 1 is of an integral structure. The fire row 1 is molded by punching and bending a metal plate. The fire row 1 has a burning substrate 11, and the burning substrate 11 may be formed in a local area after the metal plate is bent.

Figure 1:
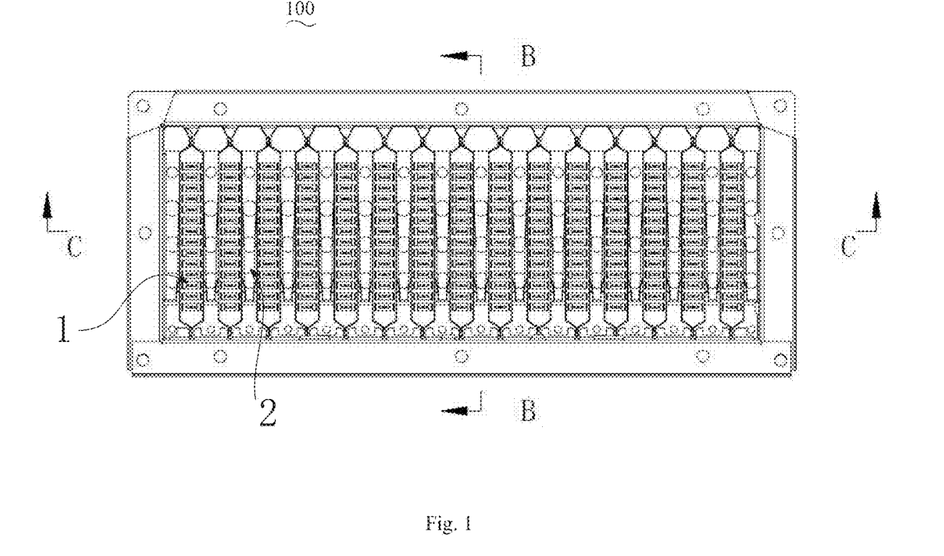
FIG. 1 is a top view of a burner provided according to an embodiment of the present invention.
Figure 2:
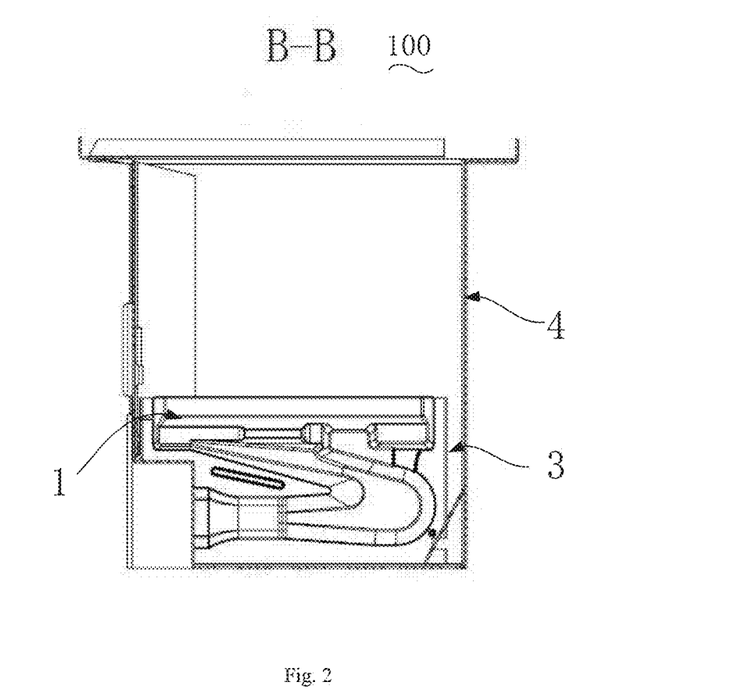
FIG. 2 is a B-B sectional view of FIG. 1.
Figure 3:
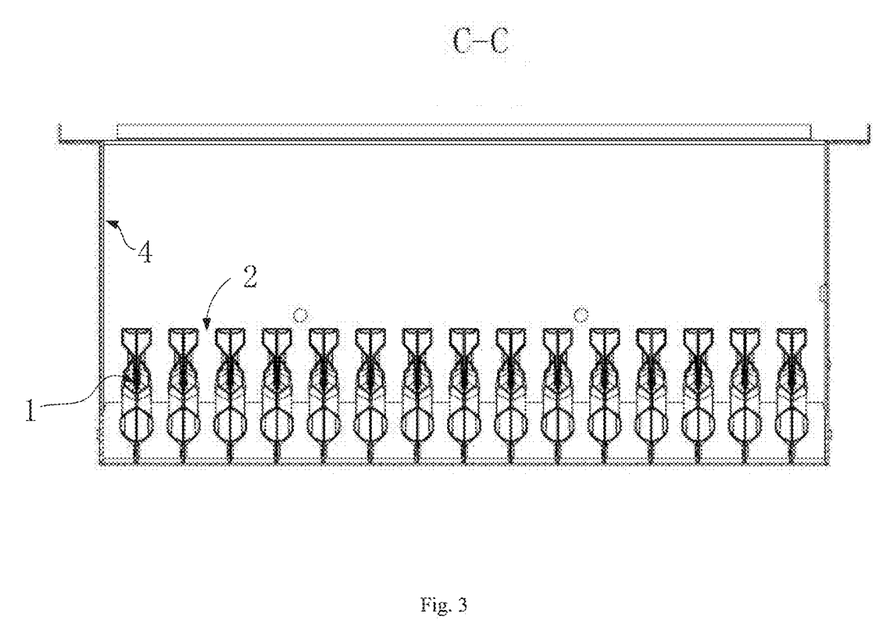
FIG. 3 is a C-C sectional view of FIG. 1.
Figure 4:
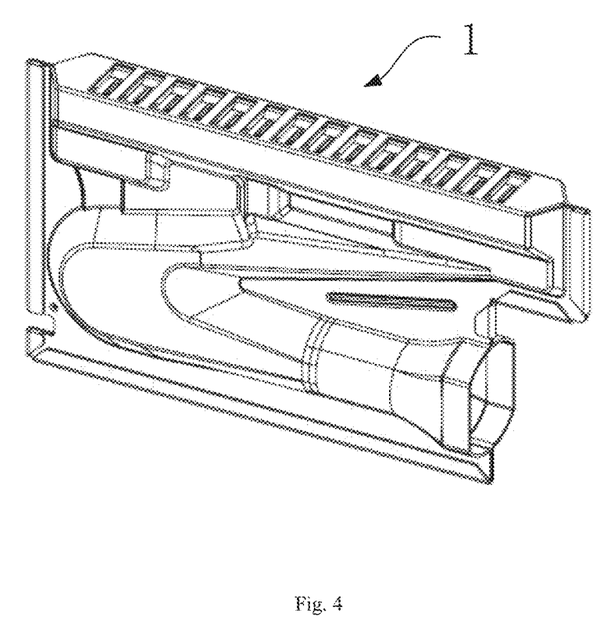
FIG. 4 is a perspective view of the fire row of FIG. 1.
Figure 5:
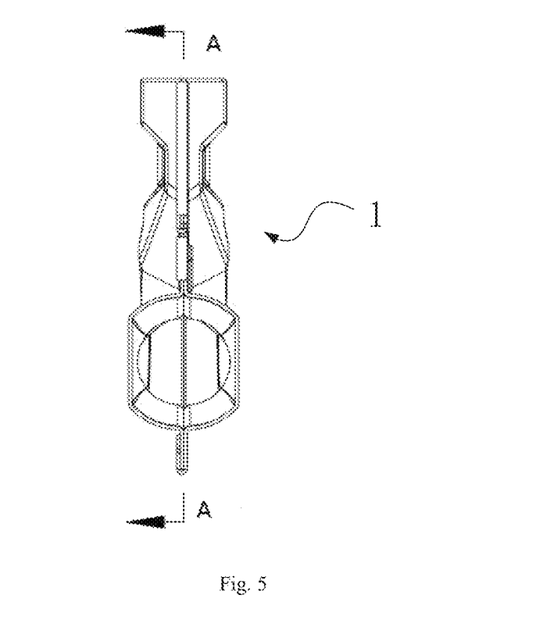
FIG. 5 is a side view of FIG. 4.
Figure 6:
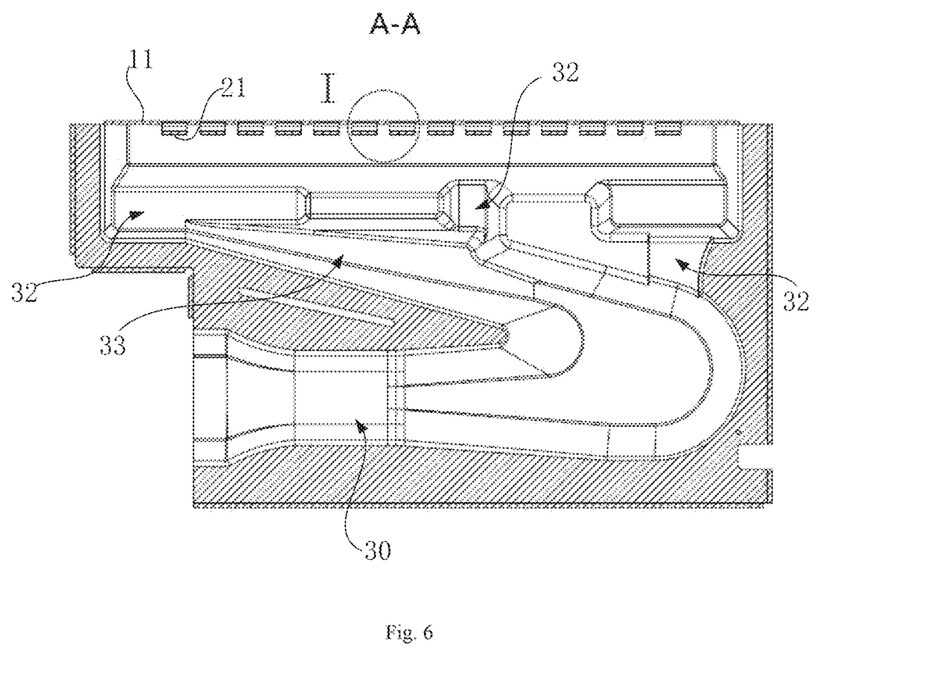
FIG. 6 is a A-A sectional view of FIG. 5.

As shown in FIGS. 1 to 3, a plurality of fire rows 1 are mounted on a frame. An air channel 2 is disposed between at least two the fire rows 1, and the mixed gas transported to the burning substrate 11 is burned on the substrate. At least two the fire rows 1 are parallel to each other; and the air channel 2 is provided between adjacent two the fire rows 1.

In this embodiment, the main burning hole 13 and/or the auxiliary burning hole 15 have a variety of shapes, where the main burning hole 13 and/or the auxiliary burning hole 15 may be selected from a group consisting of elongated hole, circular hole, polygonal hole or irregular hole. The inventor has found upon research that when the main burning hole 13 and the auxiliary burning hole 15 are elongated holes, the burner 10 can achieve an optimal burning effect.

Referring to FIGS. 4 to 8 all together, the burning substrate 11 may have a substrate surface 17; the burning substrate 11 is provided with a burning platform 21; the main burning holes 13 are disposed on the burning platform 21; and the burning platform 21 has a platform surface 25; the substrate surface 17 is disposed downstream of the platform surface 25. The burning substrate 11 has a substrate inlet surface 19 facing away from the substrate surface 17. A combustible gas passes through the burning substrate 11 from the substrate inlet surface 19 to a burning surface of the substrate and thus enters a burning state. The substrate surface 17 and/or the substrate inlet surface 19 may be a planar surface or a curved surface, which is not limited in the present invention.

The burning substrate 11 may be provided with at least one burning platform 21, and the main burning holes 13 are arranged on the burning platform 21. The burning platform 21 has a platform surface 25 facing the main flame and a platform inlet surface 27 facing away from the main flame. The platform surface 25 (along the burning direction F) is disposed upstream of the substrate surface 17. In this embodiment, the main burning holes 13 are provided on the burning substrate by providing the burning platform 21 having the main burning holes 13 on the burning substrate 11.

In this embodiment, the platform surface 25 is disposed upstream of the substrate surface 17 along the burning direction F, so that the main burning holes 13 can be disposed upstream of the auxiliary burning holes 15 along the burning direction F, that is, the auxiliary burning holes 15 are located downstream of the main burning holes 13 along the burning direction F. Since the size of the main flame is larger than that of the auxiliary flame, the auxiliary burning hole 15 provided downstream of the main burning hole 13 can easily assist in intersection of the auxiliary flame with the main flame, thereby resulting in a flame opposing. Specifically, the auxiliary burning holes 15 may be provided on the burning substrate 11 at a position adjacent to the burning platform 21.

In one embodiment of the present invention, the auxiliary burning holes are disposed between the substrate surface and the platform surface. Since the platform surface 25 is located upstream of the substrate surface 17 along the gas transportation direction of the combustible gas (the burning direction F), there exists some space between the platform surface 25 and the substrate surface 17. The auxiliary burning holes 15 are disposed between the platform surface 25 and the substrate surface 17, so that the auxiliary burning holes 15 are closer to the main burning holes 13 provided on the burning platform 21 to facilitate the intersection of the main flame with the auxiliary flame.

Further, the space between the platform surface 25 and the substrate surface 17 is downstream of the platform surface 25 along the burning direction F, as introduced above, the auxiliary burning holes 15 formed in this space may orient the auxiliary burning holes 15 towards the main burning holes 13 or the main flame, to further promote the intersection of the auxiliary flame with the main flame and produce an effect of flame opposing. In this embodiment, the number of the auxiliary burning holes 15 may be more than one. Specifically, for example, if the number of the auxiliary burning holes 15 is two, the auxiliary burning holes 15 may be strip-shaped holes oppositely disposed on two sides of the burning platform 21. If the number of the auxiliary burning holes 15 is three, the auxiliary burning holes 15 may be one strip-shaped hole disposed on one side of the burning platform 21 (the main burning holes), and two strip-shaped holes oppositely disposed on the other side of the burning platform 21. A case of a greater number will not be described any more.

In this embodiment, the burning platform 21 may be connected to the burning substrate 11 via a connecting portion (not shown), where the auxiliary burning hole 15 may be provided on the connecting portion. When the number of the auxiliary burning holes 15 is more than one, the connection portion may partition the auxiliary burning holes 15 adjacent to each other. The connecting portion may also serve as a guide for the main flame, that is, the mixed gas flowing out of the main burning hole 13 moves along the connecting portion during the burning to allow the main flame to be more concentrated and reduce heat loss.

It should be noted that, the burning platform 21 and the burning substrate 11 may form an integral structure. For example, the burning platform 21 may be formed by punching a portion of the burning substrate 11; the burning platform 21 and the burning substrate 11 may also be formed by connecting different components, for example, connecting the burning platform 21 with the burning substrate 11 by welding. In addition, the burning platform 21 and the burning substrate 11 may be arranged in parallel or may be arranged not in parallel with each other. For example, the burning substrate 11 is a flat plate as a whole, and the burning platform 21 is also a flat plate. The burning platform 21 may be located below the burning substrate 11 and parallel to the burning substrate 11 in height (when the reader is facing FIG. 7), or the platform 21 and the burning substrate 11 are arranged at an angle, and the present invention is not particularly limited thereto.

In one embodiment, a plurality of grooves 20 are formed by being punched on the burning substrate 11 to depart from the burning direction of the fire row 1; the bottom surface of the groove 20 is the platform surface 17; and the auxiliary burning hole 15 are disposed on the side wall of the groove 20. At this time, the bottom wall of the groove 20 is formed as the burning platform 21. In this embodiment, the burning substrate 11 and the burning platform 21 form an integral structure and can be molded by punching, this is very convenient for processing.

Figure 9:
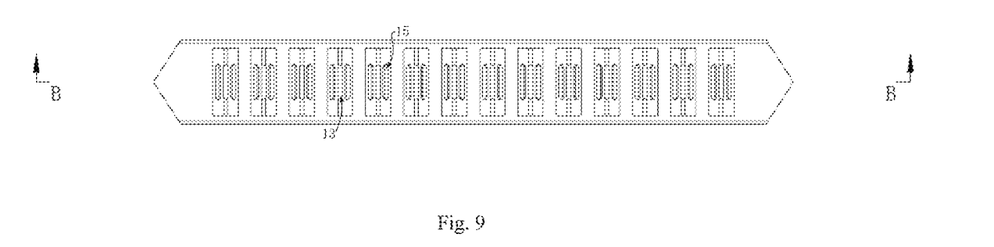
FIG. 9 is a top view of a burning substrate of the fire row provided according to another embodiment.
Figure 10:
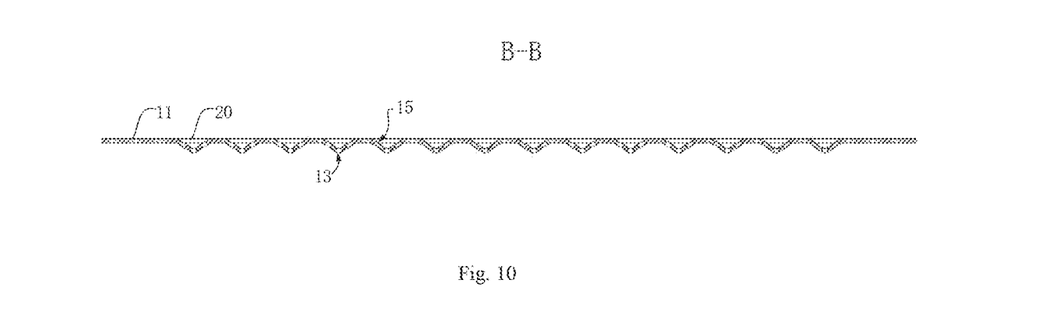
FIG. 10 is a B-B cross-sectional schematic view of FIG. 9.

In this embodiment, the groove 20 may have a variety of shapes, such as a cylindrical groove, a prismatic groove, a truncated circular groove, or an irregular groove (as shown in FIGS. 9 and 10). In order to facilitate the arrangement and punching, the grooves 20 preferably have a rectangular shape. In this case, the bottom wall of the groove 20 is parallel to the burning substrate 11.

As shown in FIG. 7, the auxiliary burning hole 15 are formed by fracture of the side wall of the groove 20 when the groove 20 is punched. The two auxiliary burning holes 15 are located on two opposite side walls of the groove 20, and the other two opposite side walls of the groove 20 connect the burning platform 21 (the bottom wall of the groove 20) with the burning substrate 11 and orient the auxiliary flame, and it can be seen that the other two opposite side walls of the groove 20 are namely the above-mentioned connection portions.

The auxiliary burning hole 15 is located between the burning substrate 11 and the burning platform 21, and (the substrate inlet surface of) the burning substrate 11 forms a barrier wall for the auxiliary burning hole 15 to flow out of the mixed gas. The barrier wall blocks the flow direction of the mixed gas, so that the flow direction of the mixed gas is changed and flowed out of the auxiliary burning hole 15, the mixed gas flowing out of the auxiliary burning holes 15 forms a large number of irregular vortex flowing (vortex flows). On the one hand, the formed vortex flows enhance a degree of uniformly mixing fuel gas and air in the mixed gas to facilitate the burning of the mixed gas; on the other hand, a microscopic irregular movement of fluids in the vortex flows can entrain a large amount of secondary air provided by the air channel, increasing the burning area of the flames. Therefore, a lower flame surface can be created during the burning.

In this embodiment, the plurality of grooves 20 are arranged along the length direction of the burning substrate 11, and each of the grooves 20 is provided with at least one the main burning hole 13. Wherein, the main burning hole 13 and the auxiliary burning hole 15 may be strip-shaped holes (which may also be referred to as long holes). The length direction of the main burning hole 13 is perpendicular to the arrangement direction of the grooves 20 (the length direction of the burning substrate 11), and it is also understood that the length direction of the main burning hole 13 corresponds to the width direction of the burning substrate 11. The number of the main burning hole 13 within one groove 20 may be one or two (for example, arrangement in parallel), etc. Since the present invention does not limit the arrangement of the main burning hole 13 within the groove 20, other number will not be described any more, and those skilled in the art can make an adaptive arrangement according to the spirit of the present invention.

As can be seen from FIG. 7, two adjacent grooves 20 communicate with each other via two auxiliary burning holes 15 adjacent to each other, and the burning substrate 11 is formed as a cross beam between the two grooves 20 (identical to the barrier wall mentioned above, as indicated by signs 17 and 19), the cross beam blocks the flow direction of the combustible gas, so that a large number of irregular vortex flows can be created in the gas to reduce the height of the flame.

Meantime, in this embodiment, the positions of the main flame and the auxiliary flame are staggered (intersected). Diffusion and exchange of fluids can be formed between the fluids that burn products at a burning interface at the interfaces adjacent to the two flame portions so that the burning propagates in the cross-beam portion in the middle of two grooves 20, thus expanding the burning area under the same outgassing conditions, which not only reduces the burning height of the main flame, but also further reduces the flame height by reducing the burning intensity.

Figure 11:
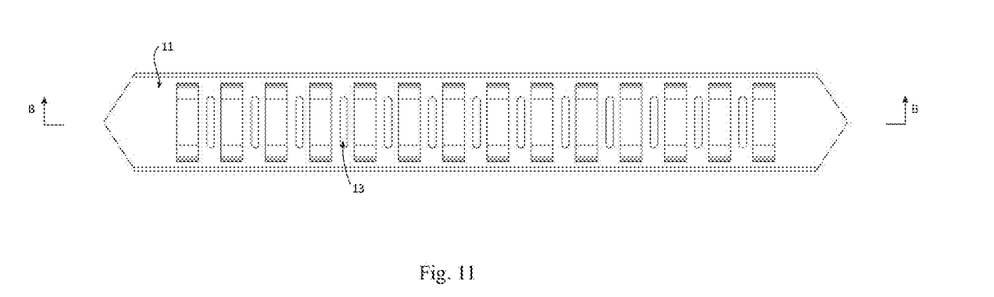
FIG. 11 is a top view of a burning substrate of the fire row provided according to another embodiment.
Figure 12:
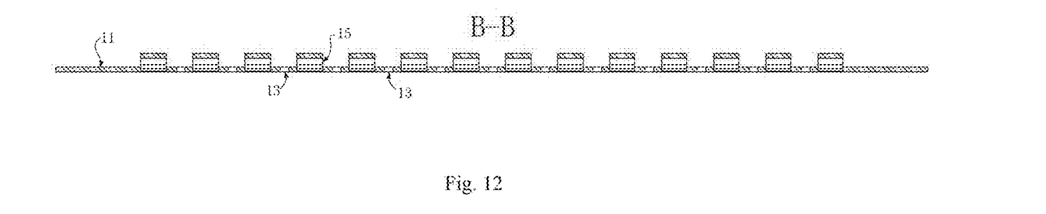
FIG. 12 is a B-B sectional schematic view of FIG. 11.

Referring to FIGS. 11 and 12, in another embodiment of the present invention, the main burning holes 13 are disposed on the burning substrate 11, grooves 20 are formed by punching the burning substrate 11 along the burning direction, the auxiliary burning holes 15 are formed by fracture of the side walls of the grooves 20 when the grooves 20 are punched. As shown in FIGS. 11 and 12, one main burning hole 13 is provided between two adjacent auxiliary burning holes 15, and the main burning hole 13 is located in the middle of the two auxiliary burning holes 15. In this embodiment, the burning substrate 11 punched along the burning direction forms the auxiliary burning holes 15 so that the auxiliary burning holes 15 are oriented towards the main burning holes 13 or the main flame, as a result, the auxiliary flame intersects with the main flame and a flame opposing is generated to suppress the flameout phenomenon, at the same time, the auxiliary burning holes 15 mate with the air channel to increase the burning area of the flame, thereby producing a lower flame.

Figure 13:
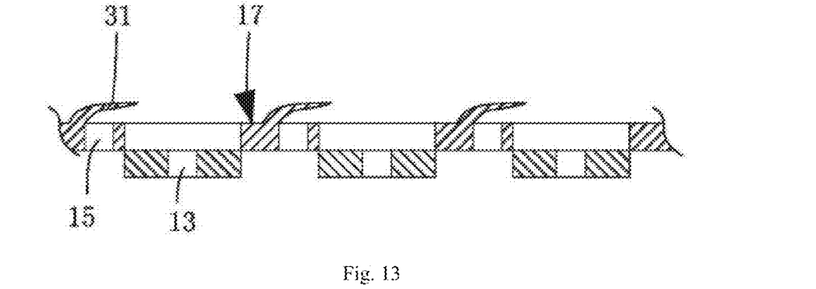
FIG. 13 is a cross-sectional schematic view of a burning substrate of the fire row provided according to another embodiment.
Figure 14:
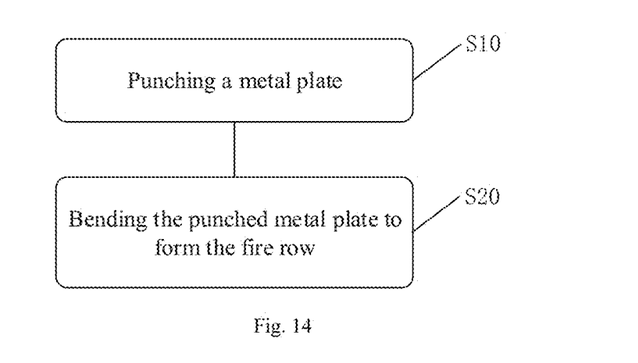
FIG. 14 is a flowchart of a processing method of fire row provided according to an embodiment of the present invention.

In one feasible embodiment, as shown in FIG. 13, both the auxiliary burning holes 15 and the main burning holes 13 are directly arranged on the burning substrate 11, and a guide nozzle 31 is partly provided on the auxiliary burning hole 15 adjacent to the substrate surface 17, so that the auxiliary burning hole 15 is oriented towards the main burning hole 13 or the main flame. In this embodiment, the auxiliary burning hole 15 is oriented towards the main burning hole 13 or the main flame by the guide nozzle 31, so that the auxiliary flame intersects with the main flame to generate a flame opposing that suppresses the flameout phenomenon while the auxiliary burning holes 15 mate with the air channel, thus a portion of the flames is quickly burned out to form a lower flame surface.

Of course, the burning substrate 11 is surely not limited to the above-mentioned mode of providing the main burning holes 13 and the auxiliary burning holes 15. In the summary of the present invention, the auxiliary burning holes 15 only need to be disposed downstream of the main burning hole 13 and distributed on two sides of the main burning hole 13, the fire row 1 in such structure can be mated with the air in the air channel 2 to form a lower flame height, which is convenient for manufacturing and reducing the height of the enclosure frame 4, so as to save the manufacturing costs.

Referring still to FIGS. 1 to 6, the fire row 1 may further comprise a gas-mixing structure 30 upstream of the burning substrate 11 along the burning direction; the gas-mixing structure 30 can mix air with fuel gas; and the gas-mixing structure 30 transports the mixed gas to the burning substrate 11 via a gas transportation channel 33. Specifically, the gas-mixing structure 30 may include a venturi tube.

Preferably, the gas transportation pipeline may be provided with a plurality of diversion channels 32 passing through the burning substrate 11 along the mixed gas flow in its interior; the positions where the plurality of diversion channels 32 pass through the burning substrate 11 are arranged along the length direction of the burner substrate. The diversion area of the plurality of diversion channels 32 gradually increases along the flowing direction of the mixed gas in the gas transportation pipeline, so that a uniform amount of the mixed gas can be supplied to the burning substrate 11 (along the longitudinal direction), the uniform distribution of the flame height can be ensured, and the burner can achieve a uniform heating.

An embodiment of the present invention further provides a gas water heater, comprising the burner 100 according to any one of the above embodiments. The gas water heater has a higher heating efficiency and a lower flame height, so that the gas water heater can reduce the height of the enclosure frame and save the manufacturing costs.

Referring to FIGS. 14 to 17 all together, an embodiment of the present invention further provides a processing method of fire row of a burner, comprising steps of:

S10, punching a metal plate; and

S20, bending the punched metal plate to form the fire row.

Figure 17:
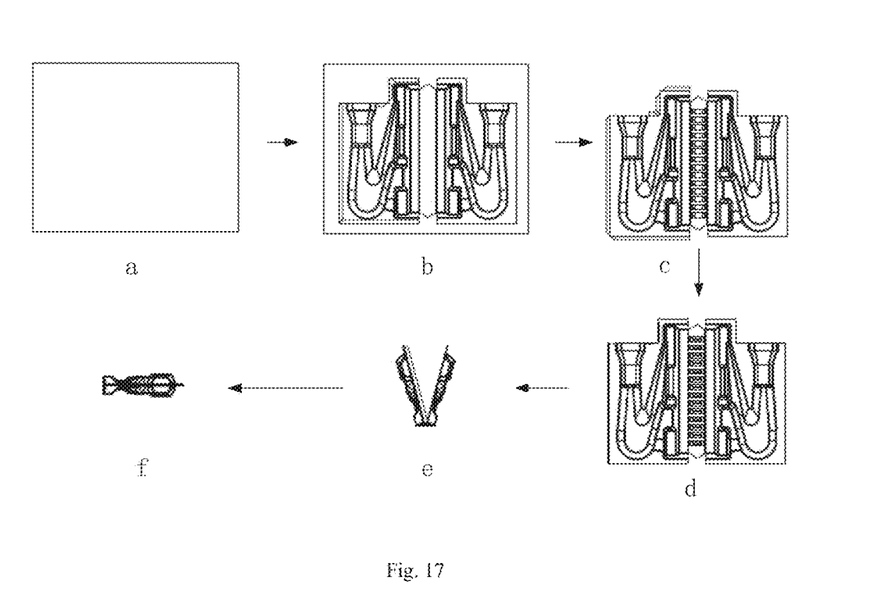
FIG. 17 is a schematic diagram of processing the fire rows provided according to an embodiment of the present invention.

In this embodiment, step S10 may also be referred to as a punching process (FIGS. 17*a* to 17*d*) and step S20 (FIGS. 17*e* and 17*f*) may also be referred to as a bending process. In the punching process, materials of the metal plate may be stainless steel or aluminum. As illustrated, the metal plate is preferably a rectangular plate for ease of processing. Of course, the metal plate can have other shapes, such as a circular plate, a trapezoidal plate and the like as well. The present invention is not limited to the rectangular plate.

In the punching process, a punching die may be used to punch the metal plate so as to form a corresponding shape (groove) by stretching on the metal plate. A pattern of the desired structure of the fire row may be formed by punching for one or more times. The fire row molded by punching can effectively save materials and reduce costs.

In the bending process, the punched metal plate can be bent and molded by a bending machine, shapes formed by punching are aligned, and the symmetrical parts of the metal plate are overlapped with each other to form fire row.

In a preferred embodiment, punching a metal plate (step S10) may comprise steps of:

S110, punching the metal plate to form a predetermined symmetrical shape; and

S120: punching a middle region of the predetermined symmetrical shape to form burning holes, and the burning holes including main burning holes and auxiliary burning holes.

In another preferred embodiment, punching a metal plate (step S10) may comprise steps of:

S111, punching the metal plate to form burning holes; and the burning holes comprise main burning holes and auxiliary burning holes; and S121, punching two sides of the burning holes to form a predetermined symmetrical shape.

The predetermined shape is a symmetrical concave shape formed by punching and stretching, and the symmetrical concave shape is distributed on two sides of the middle region (burning holes). The predetermined shape (concave pattern) is aligned after the metal plate is bent to form a gas-mixing structure of the fire row and a gas transportation channel. The middle region is a region in strips, and a burning substrate of the fire row is formed after the metal plate is bent.

In the punching process, the direction in which the burning holes are punched is opposite to the direction in which the predetermined shape is punched. That is, when the reader faces FIG. 15, the direction in which the predetermined shape is punched is oriented inside the paper, while the direction in which the burning holes are punched is oriented outside the paper.

Specifically, punching to form burning holes (step S120 or S121) may comprise steps of:

S121, punching the metal plate to form a plurality of grooves; side walls of the grooves are fractured in the punching to form the auxiliary burning holes; and S122, piercing bottoms of the grooves to form the main burning holes.

The plurality of grooves are arranged along the length direction of the middle region and the auxiliary burning holes are distributed along the length direction of the middle region on two opposite side walls of the grooves. For the structure, shape and function of the grooves and the burning holes, references may be made to the structure, shape and function of the grooves and the burning holes in the burner in the above embodiment, which will not be described one by one here.

Correspondingly, bending the punched metal plate to form the fire row (step S10) comprises steps of:

S200: bending the metal plate to make the predetermined symmetrical shapes be aligned to form a gas-mixing structure and a gas transportation channel. The gas-mixing structure can mix air with fuel gas, and the gas-mixing structure transports the mixed gas to the burning holes via the gas transportation channel.

In one embodiment, the processing method of the fire row may further comprise steps of:

S115, shaping and/or trimming the punched metal plate.

In this embodiment, step S115 may also be referred to as a shaping and trimming process. Step S115 may be performed following step S10. Specifically, step S115 may be performed following step S110. The shaping and trimming process can shape the concave shape after punching the formed concave shape once, so as to adjust the shape to the desired state. The shaping process can solve problems that punching is not in place, and that the punched shape needs fine adjustment in the punching process, thereby obtaining an optimal punching shape.

Figure 15:
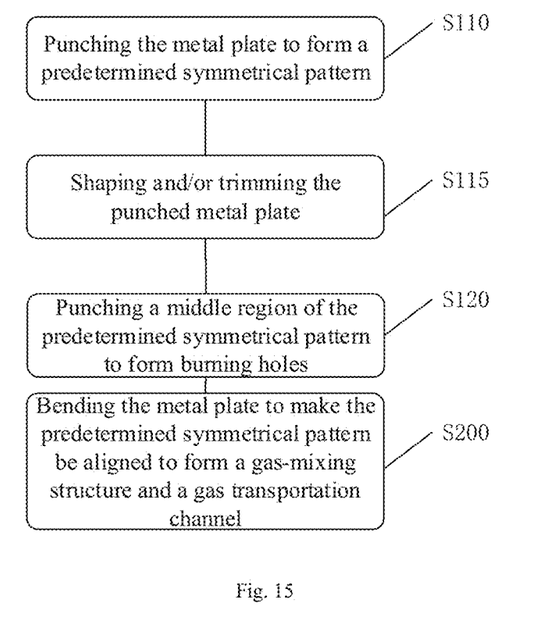
FIG. 15 is a flowchart of specific steps of FIG. 12.
Figure 16:
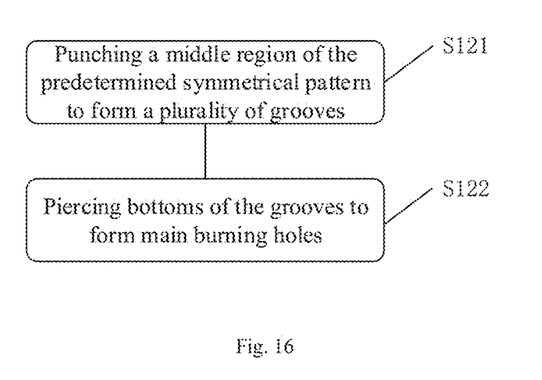
FIG. 16 is a flowchart of a specific step of step S120 in FIG. 13.

The shaping and trimming process can remove the excess material when it is available after the metal plate is punched. As illustrated in FIG. 15, the metal plate is usually a rectangular plate on which a predetermined shape is punched. A portion of the rectangular plate cannot participate in the formation of the fire row so that the remaining portion of the rectangular plate is cut off after the material of the required portion of the fire row is determined.

In the step S115, the shaping process and the trimming process do not have any specific execution sequence. The shaping process may be performed prior to the trimming process or following the trimming process, or both processes may be performed simultaneously, which is not particularly limited in the present invention.

Any numerical value cited herein includes all values of lower and upper values that increment in one unit from a lower limit to an upper limit and there is an interval of at least two units between any lower value and any higher value. For example, if it is stated that a number or process variable (e.g., temperature, pressure, time, etc.) of one member has a value from 1 to 90, preferably from 20 to 80, more preferably from 30 to 70, it has an objective to demonstrate that the Description also explicitly enumerates values such as 15 to 85, 22 to 68, 43 to 51, 30 to 32, and the like. For values less than 1, it is appropriate to consider one unit as 0.0001, 0.001, 0.01, 0.1. These are examples that are only intended to be expressly stated, and all possible combinations of numerical values enumerated between the lowest value and the highest value are explicitly set forth in this Description in a similar manner.

Unless otherwise indicated, all the ranges include endpoints and all numbers between endpoints. A wording "approximately" or "approximate" used with a range is suitable for both endpoints of the range. Thus, "approximately 20 to 30" is intended to cover "about 20 to about 30", at least including the indicated endpoints.

All disclosed articles and references, including patent applications and publications, are hereby incorporated by reference for all purposes. The term "consisting essentially of" to describe a combination shall include the element, ingredient, component or step that is being determined and other elements, ingredients, components or steps that do not essentially affect basic novel characteristics of the combination. Use of the term "comprising" or "including" to describe a combination of elements, ingredients, components or steps herein also contemplates embodiments that are substantially composed of those elements, ingredients, components or steps. Any property described to demonstrate that a term "may" includes is selectable by use of the term "may" herein.

A plurality of elements, ingredients, components or steps can be provided by a single integrated element, ingredient, component or step. Alternatively, the single integrated element, ingredient, component, or step may be divided into a plurality of separated elements, ingredients, components, or steps. The disclosure of "a" or "an" to describe an element, an ingredient, a component, or a step is not intended to exclude other elements, ingredients, components, or steps.

It should be understood that the above description is for purposes of illustration, and not for purposes of limitation. By reading the above description, various embodiments and applications in addition to the embodiments provided will be readily apparent to those skilled in the art. Therefore, the scope of this teaching should not be determined with reference to the above description, but determined with reference to an overall range of the appended claims, along with equivalents to which those claims are entitled. For completeness, the disclosures of all articles and references, including patent applications and publications, are incorporated herein by reference. An omission of the subject matter in any aspect disclosed herein in the preceding claims is not intended to disclaim the subject matter, nor should it be considered that the inventor does not consider the subject matter as a portion of the disclosed subject matter of the invention.

The invention claimed is:

1. A burner, comprising:
   a plurality of fire rows; an air channel is formed between at least two fire rows; the fire row has a burning substrate; the burning substrate is provided with main burning holes; the burning substrate is further provided with auxiliary burning holes downstream of the main burning holes; at least one the auxiliary burning hole is disposed on at least one side of the main burning hole in a length direction of the burning substrate; flame of the auxiliary burning hole disposed on at least one side of the main burning hole intersects with flame of the main burning hole; the auxiliary burning holes are provided to confront the flames of the main burning holes; the main burning holes and the auxiliary burning holes are connected with a gas-mixing structure; and
   a frame for mounting the fire rows.

2. The burner according to claim 1, wherein at least two of the auxiliary burning holes are disposed on two sides of the main burning hole in the length direction of the burning substrate.

3. The burner according to claim 2, wherein the auxiliary burning holes on two sides of the main burning hole are disposed to be opposite.

4. The burner according to claim 1, wherein the burning substrate has a substrate surface; the burning substrate is provided with a burning platform; the main burning holes are disposed on the burning platform; the burning platform has a platform surface; and the substrate surface is disposed downstream of the platform surface.

5. The burner according to claim 4, wherein the auxiliary burning holes are disposed between the substrate surface and the platform surface.

6. The burner according to claim 5, wherein a plurality of grooves are formed by being punched on the burning substrate to depart from a burning direction of the fire row; bottom surfaces of the grooves is the platform surface, and the auxiliary burning hole is disposed on side wall of the groove.

7. The burner according to claim 6, wherein the auxiliary burning hole is formed by fracture of the side wall of the groove when the groove is punched.

8. The burner according to claim 6, wherein the plurality of grooves are arranged in the length direction of the burning substrate, and each of the grooves is provided with at least one the main burning hole.

9. The burner according to claim 1, wherein the fire row further includes a gas-mixing structure that is at upstream of the burning substrate in the burning direction; the gas-mixing structure can mix air with fuel gas; and the gas-mixing structure transports mixed gas to the burning substrate via a gas transportation channel.

10. The burner according to claim 9, wherein the fire row is formed as an integral structure.

11. The burner according to claim 10, wherein the fire row is molded by punching and bending a metal plate.

12. The burner according to claim 1, wherein at least two the fire rows are parallel to each other; and the air channel is disposed between adjacent two the fire rows.

13. A gas water heater, wherein comprising the burner according to claim 1.

14. A processing method of fire row of the burner according to claim 1, wherein the processing method comprising:
   punching a metal plate; and
   bending the punched metal plate to form the fire row.

15. The processing method of the fire row according to claim 14, wherein punching a metal plate comprising:
   punching the metal plate to form a predetermined symmetrical shape;
   punching a middle region of the predetermined symmetrical shape to form burning holes, the burning holes including main burning holes and auxiliary burning holes;
   correspondingly, bending the punched metal plate to form the fire row comprising:
   bending the metal plate to make the predetermined symmetrical shape be aligned to form a gas-mixing structure and a gas transportation channel, the gas-mixing structure capable of mixing air with fuel gas, and the gas-mixing structure transporting mixed gas to the burning holes via the gas transportation channel.

16. The processing method of the fire row according to claim 15, wherein a direction for punching the burning holes is opposite to a direction for punching the predetermined shape.

17. The processing method of the fire row according to claim 15, wherein further comprising:
   shaping and/or trimming the punched metal plate.

18. The processing method of the fire row according to claim 15, wherein punching to form burning holes comprising:
   punching the metal plate to form a plurality of grooves; side walls of the grooves are fractured in the punching to form the auxiliary burning holes; and
   piercing bottoms of the grooves to form the main burning holes.

19. The processing method of the fire row according to claim 14, wherein punching a metal plate comprising:
   punching the metal plate to form burning holes, the burning holes including main burning holes and auxiliary burning holes;
   punching two sides of the burning holes to form a predetermined symmetrical shape;
   correspondingly, bending the punched metal plate to form the fire row comprising:
   bending the metal plate to make the predetermined symmetrical shape be aligned to form a gas-mixing structure and a gas transportation channel, the gas-mixing structure capable of mixing air with fuel gas, and the gas-mixing structure transporting mixed gas to the burning holes via the gas transportation channel.

* * * * *